(12) United States Patent
Robinson

(10) Patent No.: US 11,092,474 B2
(45) Date of Patent: Aug. 17, 2021

(54) LIQUID LEVEL SENSOR

(71) Applicant: Mission Communications, LLC, Norcross, GA (US)

(72) Inventor: Forrest Robinson, Norcross, GA (US)

(73) Assignee: Mission Communications, LLC, Norcross, GA (US)

(*) Notice: Subject to any disclaimer, the term of this patent is extended or adjusted under 35 U.S.C. 154(b) by 0 days.

(21) Appl. No.: 16/849,580

(22) Filed: Apr. 15, 2020

(65) Prior Publication Data

US 2020/0333174 A1    Oct. 22, 2020

Related U.S. Application Data

(60) Provisional application No. 62/834,676, filed on Apr. 16, 2019.

(51) Int. Cl.

| | |
|---|---|
| *G01F 23/36* | (2006.01) |
| *G01F 23/00* | (2006.01) |
| *G08C 17/00* | (2006.01) |
| *G01F 23/76* | (2006.01) |

(52) U.S. Cl.
CPC ........ *G01F 23/0038* (2013.01); *G01F 23/363* (2013.01); *G01F 23/76* (2013.01); *G08C 17/00* (2013.01)

(58) Field of Classification Search
CPC .... G01F 23/0038; G01F 23/76; G01F 23/363; G01F 1/005; G01F 23/32; G01F 23/34; G01F 23/36; G01F 23/38; G01F 23/33; G01F 23/443; G01F 23/46; G08C 17/00

USPC ....... 340/618, 623, 625; 73/290 R, 305–309, 73/313, 314, 317, 215
See application file for complete search history.

(56) References Cited

U.S. PATENT DOCUMENTS

| | | | | |
|---|---|---|---|---|
| 5,301,550 | A * | 4/1994 | Shortis ................. | G01F 23/32 73/317 |
| 2005/0045458 | A1* | 3/2005 | Daly ..................... | H01H 36/02 200/190 |
| 2009/0064777 | A1* | 3/2009 | Mundo .................. | G01F 23/38 73/317 |
| 2012/0260729 | A1* | 10/2012 | Bayley ................. | G01F 23/363 73/305 |
| 2017/0138776 | A1* | 5/2017 | Philiben ............... | G01F 23/32 |

FOREIGN PATENT DOCUMENTS

EP    2 816 330    * 12/2014

* cited by examiner

*Primary Examiner* — Robert R Raevis
(74) *Attorney, Agent, or Firm* — Bryan W. Bockhop; Bockhop Intellectual Property Law, LLC

(57) ABSTRACT

A liquid level sensor includes a base member disposed above the liquid. A lever arm is pivotally attached to the base member. The lever arm is configured to interact with the liquid so that it has an angular displacement relative to the base member. The angular displacement is a function of the level of the liquid in the liquid channel. A sensor senses angular displacement of the lever arm. A communications circuit transmits the angular displacement of the lever arm to a remote location. In a method of detecting a liquid level, a float that is buoyant in the liquid is placed into the liquid and is coupled to a lever arm. An angular displacement of the lever arm relative to a base member is measured. The liquid level is a function of the angular displacement of the lever arm.

5 Claims, 3 Drawing Sheets

LIQUID LEVEL SENSOR

CROSS-REFERENCE TO RELATED APPLICATION(S)

This application claims the benefit of U.S. Provisional Patent Application Ser. No. 62/834,676, filed Apr. 16, 2019, the entirety of which is hereby incorporated herein by reference.

BACKGROUND OF THE INVENTION

1. Field of the Invention

The present invention relates to liquid level sensors and, more specifically, to a liquid level sensor adapted for use in sewer manholes and water tanks.

2. Description of the Related Art

Manholes are chambers constructed at suitable intervals along sewer lines for providing access into them. In certain applications, it is important to monitor the level of liquid, such as waste water, inside of a manhole since a high level in a manhole can indicate a blockage in a connected sewer line. The simplest way to monitor liquid levels inside of manholes is through visual inspection. However, it can be excessively burdensome to perform such inspection on a regular basis for a large number of manholes.

Current automatic manhole monitoring systems include floats connected to mechanical switches, such as electro-mechanical switches. When a float moves upwardly past a threshold, a ball moves to cause the connected switch to close, thereby sending an electrical signal to a monitoring station. However, flammable gases such as methane can build up in a manhole due to decay of organic matter and sparking from an electro-mechanical switch can result in a hazardous situation. Furthermore, compromised cable insulation or the protective shell of the float can allow the salts common in sewerage to allow leakage currents to flow in parallel to the switch causing a false indication of a "closed" circuit.

A float based or point level system can only indicate if the level is above or below a certain point. Current systems are available that utilize analog level detection based on sonar or pressure.

In the case of sonar-based level sensor a sound wave is transmitted from the top of the manhole such that it reflects off of the bottom and received a brief time later. The distance between the top of the water and the instrument will determine the time for sound wave to travel. The circuitry for a sonar-based system is power intensive and can cause a spark. Furthermore, directing the sound wave such that it does not bounce off of walls (multipath). Or get diffused by foam and grease floating on the surface of the liquid can cause inaccurate readings.

Analog level readings can be determined by the pressure reading at the bottom of an open vessel. A column of water one foot high will generate a pressure of 2.3 psi. Numerous technologies exist to convert pressure to an electrical signal such as a piezo electric 4-20 mA pressure transducer. This requires that the sensing element be submerged at the bottom of the vessel and a 2 or 3 wire cable traverse back to the monitoring device generally at the top of the vessel Therefore, there is a need for a level monitoring system that minimizes risk of sparking, is above the liquid, is not susceptible to compromised conductors and can yield point and or analog level information.

SUMMARY OF THE INVENTION

The disadvantages of the prior art are overcome by the present invention which, in one aspect, is a liquid level sensor for sensing level of a liquid in a liquid channel. A base member is disposed above the liquid. A lever arm is pivotally attached to the base member. The lever arm is configured to interact with the liquid so that it has an angular displacement relative to the base member. The angular displacement is a function of the level of the liquid in the liquid channel. A sensor is configured to sense the angular displacement of the lever arm. A communications circuit is configured to transmit an indication of the angular displacement of the lever arm to a remote location.

In another aspect, the invention is a method of detecting a liquid level, in which a float that is buoyant in the liquid is placed into the liquid. The float is coupled to a lever arm. An angular displacement of the lever arm relative to a base member is measured. The liquid level is calculated as a function of the angular displacement of the lever arm.

In yet another aspect, the invention is a method of detecting a liquid level of a liquid that is flowing through a channel, in which a lower portion of paddle that is pivotally affixed to a base member is placed into the liquid. An angular displacement of the paddle relative to the base member is sensed. The liquid level is calculated as a function the angular displacement of the paddle.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
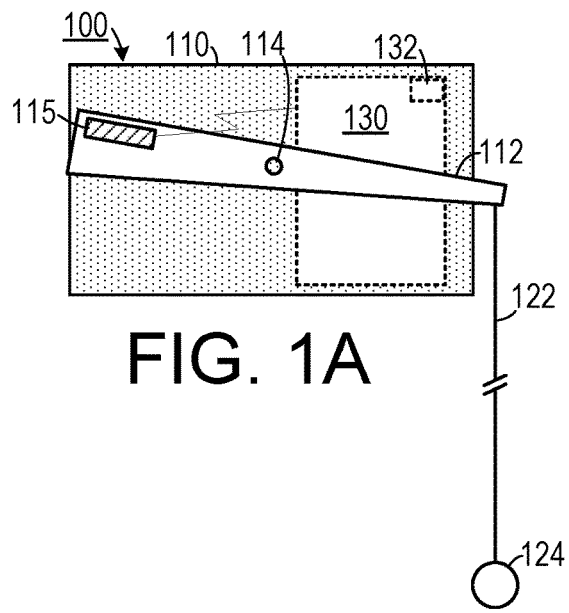
FIG. 1A is a schematic diagram of one representative embodiment of a liquid level sensor employing an accelerometer-type deflection sensor.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1A, one embodiment of a liquid level sensor 100 includes a sealed box 110 base member with a lever arm 112 attached thereto at a pivot 114. One side of the lever arm 112 has an accelerometer 115 for sensing movement of the lever arm 112 (which can also act as a counterweight). The accelerometer 115 could be embedded with a battery and a communications circuit—such as a Bluetooth circuit to communicate data—and then hermetically sealed to protect it from the liquid. It could even be sealed within the lever arm 112. The opposite side of the lever arm 112 has a cable 122 (or a cord or a rod) depending downwardly therefrom, with a float 124 affixed to the end of the cable 122. The size and weight of the float 124 are chosen based on the density of the liquid in the manhole and the specific application. An electronics suite 130 (which could include a controller, a communications circuit 132 and a battery) is disposed within the hermetically sealed box 110 and is responsive to a signal from the accelerometer 115. The box 110 is sealed so that the liquid will not interfere with the electronics contained therein. The float 124 floats on the surface of the liquid so that when the liquid level goes down, the lever arm 112 will be rotationally displaced in the direction of the float 124 (e.g., clockwise in the embodiment shown) as it pulls down in the cord 122. This rotational displacement is sensed by the accelerometer 115 and the electronics suite 130 transforms the signal from the accelerometer 115 to an indication of the liquid level. The communications circuit 132 can include a wireless chipset (for example, a cellular telephone chipset, local area network chipset, a Bluetooth chipset or a ZigBee chipset) to transmit liquid level data to remote locations.

Figure 1B:
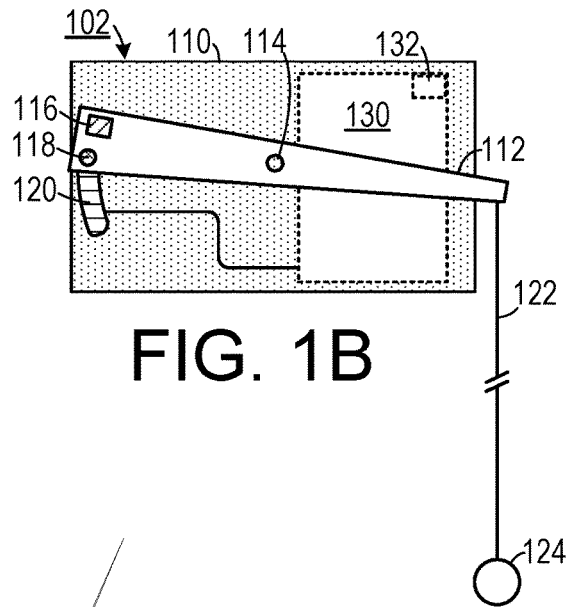
FIG. 1B is a schematic diagram of a second representative embodiment of a liquid level sensor employing a reed switch-type deflection sensor.

As shown in FIG. 1B, another embodiment of a liquid level sensor 102 includes a sealed box 110 with a lever arm 112 attached thereto at a pivot 114. One side of the lever arm 112 has a counterweight 116 and a magnet 118 affixed thereto. The opposite side of the lever arm 112 has a cable 122 (or cord) depending downwardly therefrom, with a float 124 affixed to the end of the cable 122. The size and weight of the float 124 are chosen based on the density of the liquid in the manhole and the specific application. A sealed reed switch 120 is disposed under the magnet 118 and is sensitive to the position of the magnet 118. As the water level 12 goes down, the weight of the float 124 will cause the float-end of the lever arm 124 to pivot downwardly. This causes the magnet 118 to be moved upwardly with respect to the reed switch 120. As the water level 12 goes up, the float 124 will move upwardly, causing the float-end of the lever arm 124 to pivot upwardly and causing the magnet 118 to be moved downwardly with respect to the reed switch 120. The controller can thus determine the water level based on the state of the reed switch 120.

Since the purpose of the cable 122 is only to suspend the float 124 it can be smaller in diameter than, for example, an electrical or optical cable. Braided fishing line is available that is very strong but thin and light. A thinner cable 122 could reduce the effects of turbulence or grease accumulation.

Figure 2:
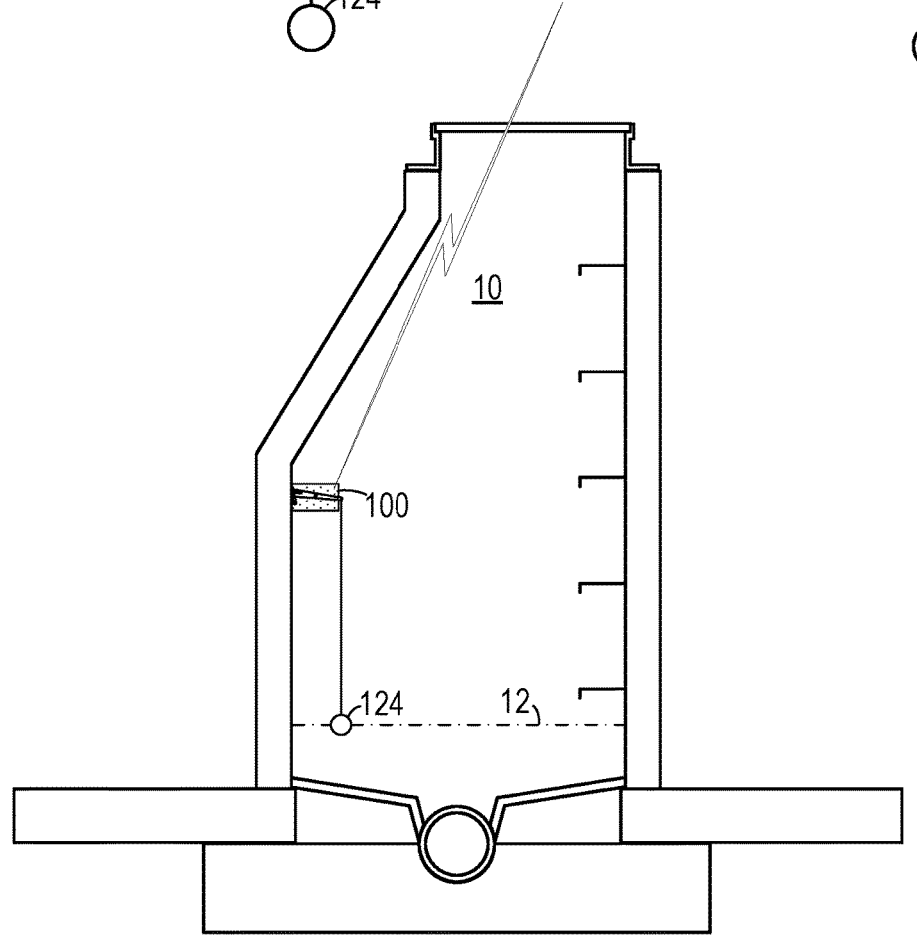
FIG. 2 is a schematic diagram of a liquid level sensor employed in a manhole.

As shown in FIG. 2, the liquid level sensor 100 can be placed in a manhole 10 so that the float 124 will float on the surface of the water 12. Information from the liquid level sensor 100 can be transmitted to a remote site through the communications circuit 132. (The communications circuit 132 could include, for example: a cellular chipset; a ZigBee chipset; a Wi-Fi chipset, or other wireless circuit. In an alternate embodiment, the communications circuit 132 could be hardwired.) If the communications circuit 132 employs a cellular chipset, then it can communicate with a cell tower and the data can then be transmitted to a remote server or to cell phones used by technicians and other service personnel.

The size, material and weight of the float 124 is chosen appropriate for the task of floating on water (or other liquid, depending upon the specific application), but being heavy enough to keep the lever arm down when suspended. The lever arm 112 can be spring loaded or it can be designed with enough of a counterweight to slightly more than offset the total weight of the lower assembly.

Figure 3:
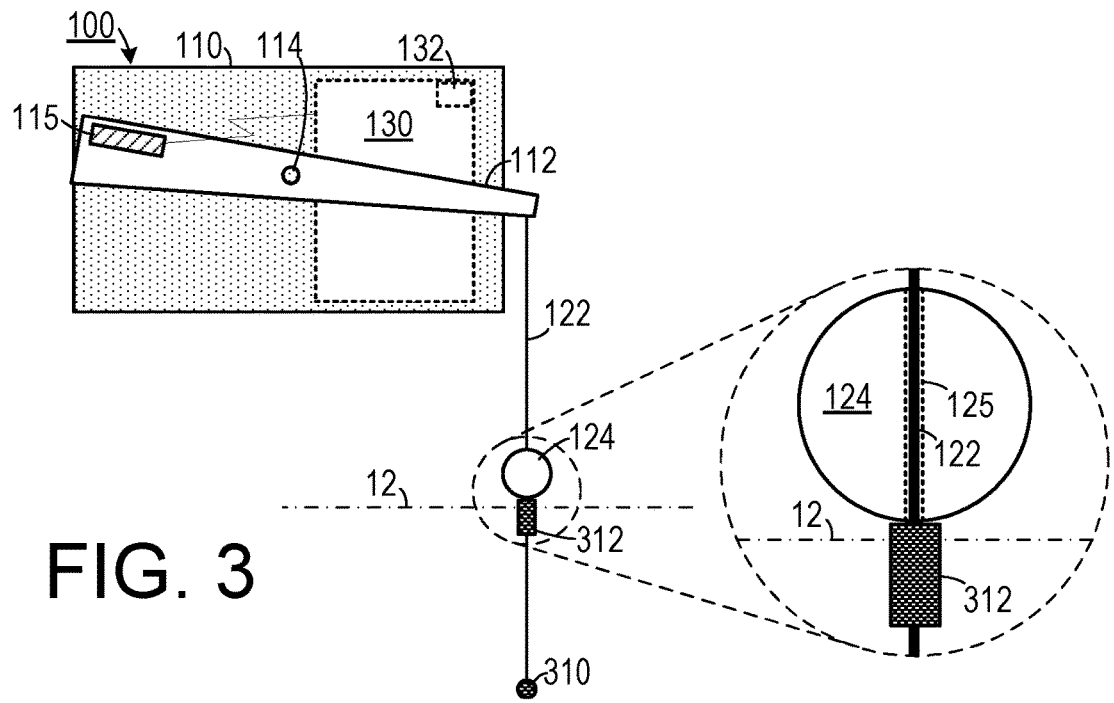
FIG. 3 is a schematic diagram of a liquid level sensor employing a float and a first collar.

As shown in FIG. 3, one embodiment can employ an added weight 310 below the float 124 to help stabilize the suspended assembly. The volume and density of the weight 310 and buoyant float 124 can be chosen so that three positions can be sensed with greater precision (entire assembly hanging, weight under water therefore less tension, float floating therefore additionally less tension.) Also, the float 124 may define a cylindrical passage 125 through which the cord 122 (which can be a cable) passes and a collar 312 may be affixed to the cord 122 that limits the downward movement of the float 124. In this embodiment, the float 124 does not exert force on the lever arm 112 until the liquid level goes below the top of the collar 312, at which point the float 124 adds weight on the cord 122. This embodiment can be employed when providing level change data is important when the liquid level is below a predetermined level.

Figure 4:
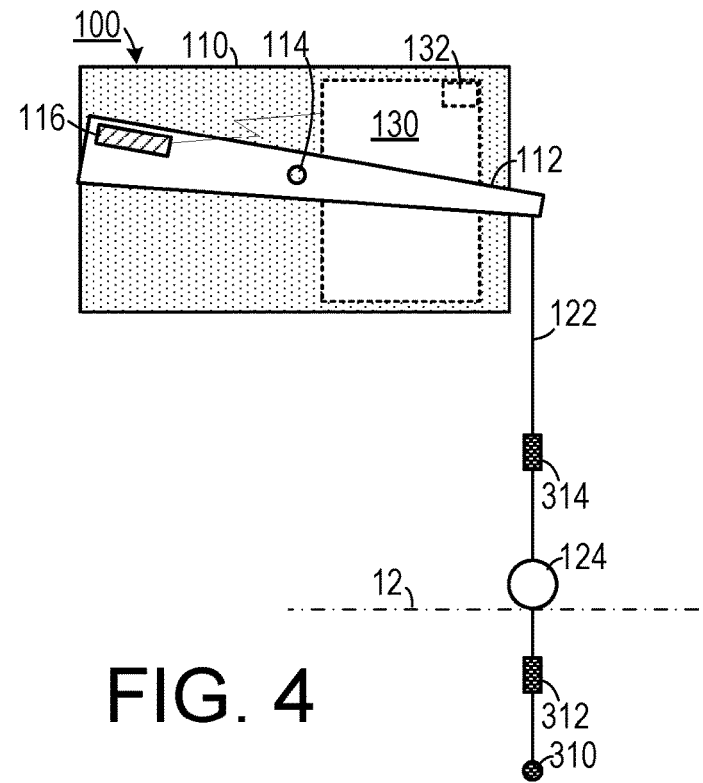
FIG. 4 is a schematic diagram of a liquid level sensor employing a float disposed between a first collar and a second collar.

In another embodiment, as shown in FIG. 4, the float 124 can be placed between a first collar 312 and a second collar 314 so that it asserts force on the cord 122 only when the liquid level is below the first collar 312 or above the second collar 314. In this case, a heavy cable or "metal rope" can be used as the cord 122 to sense yet an additional position (a forth position). Since the float 124 can slide along the cable between the two collars a high level situation causes the float to lift the cable and lower elements. The float 124 puts upward force on the second collar 314 when the liquid level is above the second collar 314 and downward force on the first collar 312 when the liquid level is below the first collar 312. This can be useful for multi-point level detection commonly required when it is desired to maintain liquid level within a predetermined range. In this application, the signal from the electronics suite 130 can be used to assert alarms and level indicators. It can also be used to control mechanisms (e.g., pump runs, pump speeds or valve settings) that increase or decrease flow into or out of the manhole.

In the embodiments described above the various cable weights can used as the lever arm to change the attitude of the monitor itself in multiple positions. An accelerometer within the monitor can be used to report the angle of the monitor. These angles can be converted to heights by the reporting system.

Figure 5A:
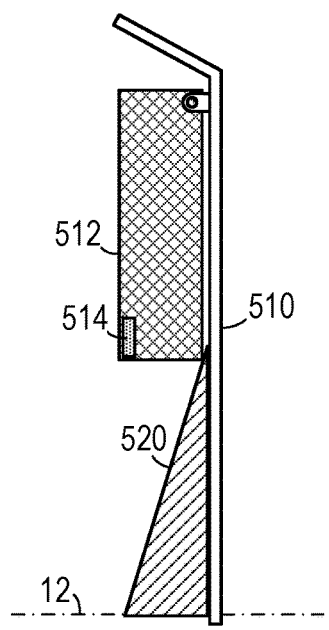
FIG. 5A is a schematic diagram of a liquid level sensor employing a float disposed between a first collar and a second collar while the liquid level is relatively low.
Figure 5B:
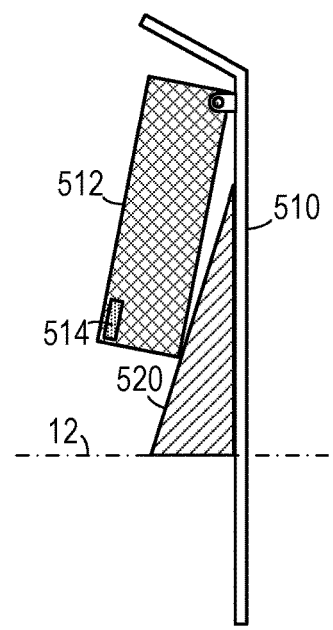
FIG. 5B is a schematic diagram the embodiment show in FIG. 5A while the liquid level is relatively high.

In certain embodiments, as shown in FIGS. 5A and 5B, the functionality of the lever can be performed with a bracket 510 holding an electronics enclosure box 512. The box 512 is hingedly attached to the mounting bracket 510 and a wedge 520 which is buoyant in the liquid 12 being sensed can change the angle of the box 512, thereby indicating that the liquid level is high enough to force the wedge upwardly. In such an embodiment, an accelerometer 514 can be employed in the box 512 to sense its angular change as the wedge 520 moves in relation thereto. The box could also contain communications circuitry of the type disclosed above for transmittal of position data to remote locations.

In one embodiment, the box can be made buoyant (without needing a wedge) and can have freedom of movement along a vertical axis or a pivotal axis. In this embodiment, an accelerometer can be used to detect movement of the box as the liquid level changes. This embodiment could be useful when only a high liquid level alarm is needed.

Figure 6A:
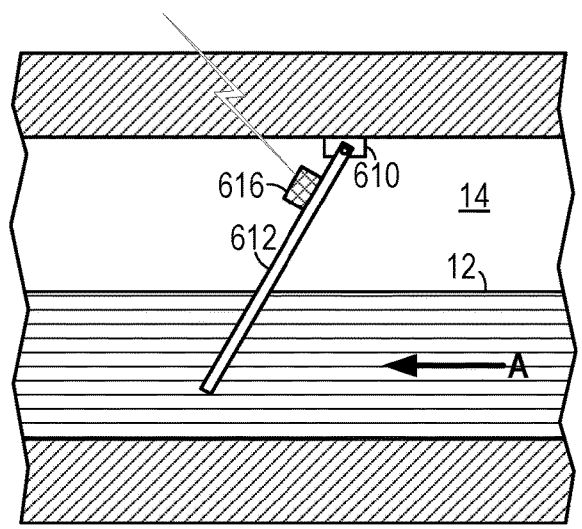
FIG. 6A is a schematic diagram of a liquid level sensor employing a paddle.
Figure 6B:
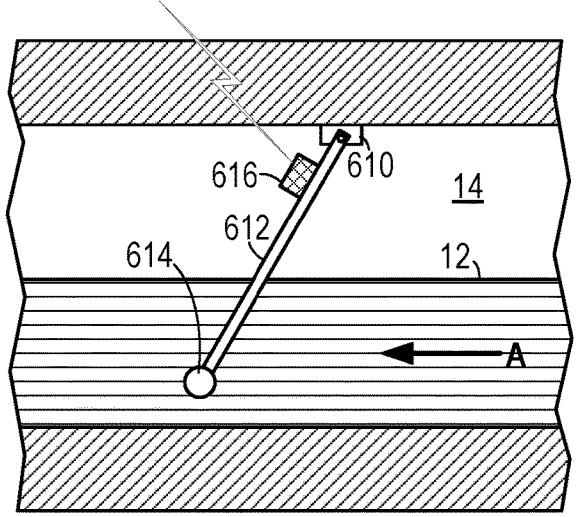
FIG. 6B is a schematic diagram of a liquid level sensor employing a paddle with an object affixed thereto.

In one embodiment, as shown in FIG. 6A, when the liquid 12 moves in a liquid channel 14 (such as in a storm sewer pipe) along a first direction A, a paddle 612 having a first end attached to a base member 610 and a opposite second end extending into the liquid 12 can serve as the lever arm. Hydrodynamic force applied by the liquid 12 to the paddle 612 causes the paddle to pivot in the direction of liquid flow. An electronics enclosure 616 can include an accelerometer to sense angular deflection of the paddle 612 and a wireless communications circuit that transmits data from the accelerometer to a remote location. As shown in FIG. 6B, an object 614 can be affixed to the second end of the paddle 612 so as to modify flow resistance of the paddle 612 to the liquid 12. Such an object 614 could be, for example, something that increases the surface area of the paddle 612 (e.g., a ball) or it could be something that regulates the flow around the end of the paddle 612 (e.g., a hydroplane).

Using the information from the lever arm angular displacement sensor in the embodiments disclosed above (which indicates the liquid level) and the geometric parameters of a channel through which the liquid is flowing, one can apply the Manning flow equation (also referred to as the "Gauckler-Manning formula") to determine a flow rate of the liquid. The Manning flow equation states:

$$V = \left(\frac{k}{n}\right) R_h^{\left(\frac{2}{3}\right)} S^{\left(\frac{1}{2}\right)}$$

where:
V is the cross-sectional average velocity;
n is the Gauckler-Manning coefficient. (Units of n are often omitted, however n is not dimensionless and is an empirically derived coefficient, which is dependent on several factors generally known to the art, including surface roughness and sinuosity.)
$R_h$ is the hydraulic radius;
S is the slope of the hydraulic grade line or the linear hydraulic head loss, which is the same as the channel bed slope when the water depth is constant.
k is a conversion factor between SI and English units. (Which can be left off if all of the units correspond to the units of the "n" term).
Methods for determining flow rates through notched weirs are well known to the art. One calculator for determining flow rates through notched weirs can be accessed online at https://www.lmnoeng.com/Weirs/vweir.php.

The present invention offers certain advantages in that it can be constructed inexpensively and can substantially reduce risk resulting from sparking, thereby making it intrinsically safe. In embodiments employing a float, if turbulent liquid rips the float away from its cable, it will fail in a "tipped" status—indicating an alarm condition. The materials for its construction can be chosen for specific environments of use, including corrosive environments. Since the lever arm has no active component, the system has relatively low power requirements, which can be satisfied by a battery to power the sensor and communications circuits.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A liquid level sensor for sensing level of a liquid in a liquid channel, comprising:
    (a) a base member disposed above the liquid;
    (b) a lever arm pivotally attached to the base member, the lever arm configured to interact with the liquid so that it has an angular displacement relative to the base member that is a function of the level of the liquid in the liquid channel;
    (c) a sensor configured to sense the angular displacement of the lever arm;
    (d) a communications circuit configured to transmit an indication of the angular displacement of the lever arm to a remote location; and
    (e) a wedge that is buoyant in the liquid, a portion of which is disposed between the base member and the lever arm so that an increase in the level of the liquid causes the wedge to move upwardly, causing the lever arm to pivot relative to the base member.

2. The liquid level sensor of claim 1, wherein the sensor comprises an accelerometer that is mounted on the lever arm.

3. The liquid level sensor of claim 1, wherein the communications circuit comprises a wireless chipset.

4. A method of detecting a liquid level, comprising the steps of:
    (a) hingedly coupling one end of a lever arm to a base member;

(b) placing a wedge that is buoyant in the liquid so that a portion of the wedged is disposed between the base member and the lever arm, wherein an increase in the liquid level causes the wedge to move upwardly, causing the lever arm to pivot relative to the base member;
(c) measuring an angular displacement of the lever arm relative to a base member; and
(d) calculating the liquid level as a function of the angular displacement of the lever arm.

5. The method of claim 4, further comprising the step transmitting the liquid level to a remote location using a wireless communication circuit.

\* \* \* \* \*